Patented Feb. 9, 1937

2,070,131

UNITED STATES PATENT OFFICE 2,070,131

MANUFACTURE OF CONDENSATION PRODUCTS FROM ALIPHATIC ALDEHYDES

Walter Philip Joshua, London, and Herbert Muggleton Stanley, Great Bookham, England, Otto Fuchs, Frankfort-on-the-Main, and Wilhelm Querfurth, Mainz-Mombach, Germany, and John Blair Dymock, Cheam, England No Drawing. Application March 27, 1934, Serial No. 717,678. In Great Britain October 26, 1931

32 Claims. (Cl. 260—106)

This application is a continuation in part of our application Serial No. 639,734, filed October 26, 1932.

The present invention relates to the manufacture of valuable condensation products from the oxygenated derivatives of the paraffin series of hydrocarbons and specifically relates to the production of alcohols, esters and other valuable derivatives of higher molecular weight from aldehydes such as acetaldehyde or acetaldehyde containing admixtures by catalytic treatment in the presence of hydrogen.

In carrying out the manufacture according to the present invention we use catalysts which consist of a difficultly reducible oxide or mixture of oxides having only feeble or no basic action and being stable at the prevailing temperature, together with a metal or mixture of metals known to have a hydrogenating or dehydrogenating action and not exceeding in quantity ten per cent by weight of the complete catalyst. The metal or metals may be taken in their metallic state and be admixed as such or the oxide or oxides may be used, it being understood that owing to the use of hydrogen as hereinbefore mentioned and as hereinafter described the oxide or oxides will rapidly be reduced. We may also use, as an addition in the catalyst, oxides having a basic reaction, but we prefer to limit the amount of these basic oxides so that the proportion present is always less than the proportion of the other catalytic constituents. On the other hand we may also employ a catalyst containing larger amounts of the basic oxide. The catalyst may be used on carriers, such as pumice or other inert material.

According to the present invention it is essential that hydrogen should be added to the reaction mixture as it has been found that improved technical results are obtained by this addition; and, moreover, the addition of hydrogen increases the activity and the life of the catalyst. Suitable amounts of hydrogen are from one half mol. hydrogen to three or more mols hydrogen for each mol. of acetaldehyde.

The conversion can be carried out at temperatures between 150 and 400° C. and moderately increased pressure may be used although we prefer to use atmospheric pressure.

As examples of the metal oxides of feebly basic action which can be used, may be mentioned alumina, uranium oxide, thoria, beryllium oxide and zirconium oxide and so forth, and as catalytic metals can be mentioned copper, nickel, silver, chromium, cadmium, zinc, tin, manganese and cobalt. Suitable oxides having a basic reaction are calcium oxide, barium oxide, strontium oxide, magnesia and lithia. By the passage of a mixture of acetaldehyde and hydrogen, for instance, over a catalyst consisting of alumina and copper, there may be obtained considerable quantities of higher esters and higher alcohols, and substantially the whole of the acetaldehyde unconverted into the aforesaid higher products is recovered without decomposition.

We have also found that by altering the proportions of metal oxide and catalytic metal in the catalyst, the course of the reaction can be influenced so that either higher yields of alcohols and the like can be produced, or the conversion can be directed towards the production of larger proportions of esters and so forth. It is essential, however, that the proportion of catalytic metal should not exceed ten per cent by weight of the total catalyst.

After the catalytic conversion the products of the reaction may be condensed and separated, or partially condensed and recirculated over the catalyst. The unconverted starting material may be recirculated over the catalyst alone or together with any of the products of the reaction.

It is obvious that acetaldehyde or acetaldehyde containing admixtures, such as were derived as by-products from a previous process for the production of higher alcohols, may be used.

The following are examples of the manner in which the invention may be carried into effect and the results obtained. It is understood that these examples are to be considered merely illustrative and are not to be construed in a limiting sense.

Example I

The catalyst employed contained in an electrically heated tube of any suitable material such as aluminium was composed as follows:—

| | Parts by weight |
|---|---|
| Alumina | 100 |
| Calcium oxide | 6 |
| Copper | 1.5 |

A mixture of acetaldehyde and hydrogen in the proportion of 1 mol. acetaldehyde to 1.5 mol. hydrogen was passed over the catalyst at a rate of 40 litres per hour (calculated as hydrogen) per litre of catalyst at atmospheric pressure and a temperature of 260° C.

The condensation products obtained (in addition to unchanged acetaldehyde and hydrogen and a small amount of ethyl alcohol) were as follows:—

| | Parts by weight |
|---|---|
| Butyl acetate | 9.3 |
| Butyl butyrate | 11.5 |
| Butyl alcohol | 20.2 |
| Alcohols higher than butyl alcohol | 10.5 |

Example II

The catalyst was composed as follows:—

| | Parts by weight |
|---|---|
| Alumina | 100 |
| Barium oxide | 6 |
| Copper | 1.5 |

The treatment being the same as in Example I, the condensation products were as follows:—

| | Parts by weight |
|---|---|
| Butyl acetate | 5.6 |
| Butyl butyrate | 5.3 |
| Butyl alcohol | 15.5 |
| Alcohols higher than butyl alcohol | 8.3 |

Example III

The catalyst was composed as follows:—

| | Parts by weight |
|---|---|
| Alumina | 100 |
| Magnesium oxide | 6 |
| Copper | 1.5 |

The treatment being the same as in Examples I and II the condensation products were as follows:—

| | Parts by weight |
|---|---|
| Butyl acetate | 6.6 |
| Butyl butyrate | 8.6 |
| Butyl alcohol | 17.9 |
| Alcohols higher than butyl alcohol | 10.5 |

Example IV

A catalyst is prepared by impregnation of activated aluminum oxide with copper formiate in such proportions that there are 95 parts by weight of metallic aluminum for each 5 parts by weight of metallic copper.

A mixture of 1.1 moles of acetaldehyde + 1.5 moles of hydrogen is passed thereover in an aluminum tube at 258°. The unconsumed acetaldehyde is thereby converted, to an extent of about 40%, into ethyl alcohol. After separation of acetaldehyde and ethyl alcohol, there are isolated

| | Parts by weight |
|---|---|
| Butyric aldehyde | 35.6 |
| Butanol | 38 |
| Hexanol fraction (containing about 90% alcohol) | 7.5 |
| High boiling alcohol, etc. (predominately decyl alcohol) | 5.0 |

Example V

A catalyst is prepared by impregnation of activated aluminum oxide with copper formiate in such proportions that there are 95 parts by weight of metallic aluminum for each 5 parts by weight of metallic copper. Acetaldehyde together with hydrogen, in a mole relationship of $$1.1 C_2H_4O : 1.5 H_2,$$

is passed over this contact at 201° or 238°. The unconsumed acetaldehyde is thereby partially converted into ethyl alcohol, and as a matter of fact, to a large extent, namely, about 70%, as was to be expected at the low reaction temperature. After separation of acetaldehyde and ethyl alcohol, the following were found:

| | Parts by weight | |
|---|---|---|
| | At 201° | At 238° |
| Butyric aldehyde | 26.3 | 37.2 |
| Ethyl acetate | 90.6 | 68.0 |
| Butanol+butyl acetate | 47 | 48 |
| Hexanol fraction (ester containing) | 17 | 33.5 |
| Octanol fraction (ester containing) | 9 | 13 |
| Decanol fraction (ester containing) | 3 | 6 |

Example VI

The catalyst was composed as follows:

| | Parts by weight |
|---|---|
| Alumina | 100 |
| Barium oxide | 6 |
| Copper | 1.5 |

Instead of barium oxide, 6 parts by weight of magnesium oxide might be used.

Butyric aldehyde and hydrogen are passed over either of the above contact masses, using about 90 liters of hydrogen for every 100 grs. of aldehyde. Upon treatment of the condensate, the following fractions are obtained:

| | Grams |
|---|---|
| Ethyl alcohol | 27 |
| Ethyl acetate | 5.4 |
| Butyric aldehyde | 27.5 |
| Butanol | 281 |
| Hexanol fraction (contains 20% ester, such as butyl butyrate in addition to aldehydes) | 115 |
| Octanol fraction | 11.5 |
| High boiling alcohol ester containing | 13.0 |

Example VII

The catalyst was composed as follows:

| | Parts by weight |
|---|---|
| Alumina | 100 |
| Barium oxide | 6 |
| Copper | 1.5 |

The following mixture in vapor form was passed at 239° C. over the above catalyst:

| | Parts by weight |
|---|---|
| Acetaldehyde | 15 |
| Butyric aldehyde | 7.5 |
| Ethyl alcohol | 73 |
| Water—remainder to make | 100 |

70 to 75 liters of hydrogen are used for every 100 grams of this mixture. Upon treatment of 335 grams of condensate, the following yields are obtained:

| | Grams |
|---|---|
| Acetaldehyde | 21.5 |
| Butyric aldehyde | 23 |
| Ethyl alcohol | 114 |
| Ethyl acetate | 108 |
| Butanol with some butyl acetate | 31 |
| Hexanol fraction | 12 |
| High boiling alcohols | 4 |

We claim:
1. The process of producing valuable condensation products from aliphatic aldehydes comprising subjecting such aliphatic aldehydes in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 400° C.

2. The process of producing valuable condensation products from aliphatic aldehydes comprising subjecting such aliphatic aldehydes in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 400° C.

3. The process of producing valuable condensation products from aliphatic aldehydes comprising subjecting such aliphatic aldehydes in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 400° C. under superatmospheric pressure.

4. The process of producing valuable condensation products from aliphatic aldehydes comprising subjecting such aliphatic aldehydes in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 400° C. under superatmospheric pressure.

5. The process of producing valuable condensation products from acetaldehyde comprising subjecting said acetaldehyde in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 400° C.

6. The process of producing valuable condensation products from acetaldehyde comprising subjecting said acetaldehyde in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 400° C.

7. The process of producing valuable condensation products from acetaldehyde comprising subjecting said acetaldehyde in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 400° C. under superatmospheric pressure.

8. The process of producing valuable condensation products from acetaldehyde comprising subjecting said acetaldehyde in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 400° C. under superatmospheric pressure.

9. The process of producing valuable condensation products from aliphatic aldehydes comprising subjecting such aliphatic aldehydes in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 400° C.

10. The process of producing valuable condensation products from acetaldehyde comprising subjecting said acetaldehyde in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

11. The process of producing valuable condensation products from aliphatic aldehydes comprising subjecting such aliphatic aldehydes in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 400° C. and under superatmospheric pressure.

12. The process of producing valuable condensation products from acetaldehyde comprising subjecting said acetaldehyde in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 400° C. and under superatmospheric pressure.

13. The process of producing valuable condensation products from aliphatic aldehydes comprising subjecting such aliphatic aldehydes in conjunction with hydrogen to the action of a mixed catalyst comprising essentially a compound taken from a group consisting of alumina, uranium oxide, thoria, beryllium oxide and zirconium oxide in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 400° C.

14. The process of producing valuable condensation products from acetaldehyde comprising subjecting said acetaldehyde in conjunction with hydrogen to the action of a mixed catalyst comprising essentially a compound taken from a group, consisting of alumina, uranium oxide thoria, beryllium oxide and zirconium oxide in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 400° C.

15. The process of producing valuable condensation products from aliphatic aldehydes comprising subjecting such aliphatic aldehydes in conjunction with hydrogen to the action of a mixed catalyst comprising essentially a compound taken from a group consisting of alumina, uranium oxide, thoria, beryllium oxide and zirconium oxide in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 400° C. and under superatmospheric pressure.

16. The process of producing valuable condensation products from acetaldehyde comprising subjecting said acetaldehyde in conjunction with hydrogen to the action of a mixed catalyst comprising essentially a compound taken from a group consisting of alumina, uranium oxide, thoria, beryllium oxide and zirconium oxide in admixture with a mixture of substances taken from a group consisting of copper, nickel, silver, chromium, cadmium zinc, tin, manganese and cobalt and the oxides thereof, said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 400° C. and under superatmospheric pressure.

17. The process of producing valuable condensation products from aliphatic aldehydes comprising subjecting such aliphatic aldehydes in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 400° C.

18. The process of producing valuable condensation products from acetaldehyde comprising subjecting said acetaldehyde in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 400° C.

19. The process of producing valuable condensation products from aliphatic aldehydes comprising subjecting such aliphatic aldehydes in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide and the reaction temperature ranging from about 150° C. to about 450° C.

20. The process of producing valuable condensation products from acetaldehyde comprising subjecting said acetaldehyde in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide and the reaction temperature ranging from about 150° C. to about 450° C.

21. The process of producing valuable condensation products from alipathic aldehydes comprising subjecting such aliphatic aldehydes in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide and the reaction temperature ranging from about 150° C. to about 450° C.

22. The process of producing valuable condensation products from acetaldehyde comprising subjecting said acetaldehyde in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide and the reaction temperature ranging from about 150° C. to about 450° C.

23. The process of producing valuable condensation products from aliphatic aldehydes comprising subjecting such aliphatic aldehydes in conjunction with hydrogen to the action of a mixed catalyst comprising a dehydrating metal compound which will be stable in the reaction as the preponderant constituent with a hydrogenating metal not exceeding in quantity 10% by weight of the complete catalyst, the reaction temperature ranging from about 150° C. to about 450° C. under superatmospheric pressure.

24. The process of producing valuable condensation products from acetaldehyde comprising subjecting said acetaldehyde in conjunction with hydrogen to the action of a mixed catalyst comprising a dehydrating metal compound which will be stable in the reaction as the preponderant constituent with a hydrogenating metal not exceeding in quantity 10% by weight of the complete catalyst, the reaction temperature ranging from about 150° C. to about 450° C. under superatmospheric pressure.

25. A process of producing valuable condensation products from aliphatic aldehydes comprising subjecting such aliphatic aldehydes in conjunction with hydrogen to the action of a mixed catalyst comprising essentially alumina in admixture with copper, said copper not exceeding in quantity 10% by weight of the complete catalyst, the reaction temperature ranging from about 150° C. to about 400° C.

26. The process of producing valuable condensation products from acetaldehyde comprising subjecting said acetaldehyde in conjunction with hydrogen to the action of a mixed catalyst comprising essentially alumina in admixture with copper, said copper not exceeding in quantity 10% by weight of the complete catalyst, the reaction temperature ranging from about 150° C. to about 400° C.

27. The process of producing valuable condensation products from aliphatic aldehydes comprising subjecting such aliphatic aldehydes in conjunction with hydrogen to the action of a mixed catalyst comprising essentially alumina in admixture with copper and calcium oxide.

28. The process of producing valuable condensation products from acetaldehyde comprising subjecting said acetaldehyde in conjunction with hydrogen to the action of a mixed catalyst comprising essentially alumina in admixture with copper and calcium oxide.

29. The process of producing valuable condensation products from aliphatic aldehydes comprising subjecting such aliphatic aldehydes in conjunction with hydrogen to the action of a mixed catalyst comprising essentially alumina in admixture with copper and magnesia.

30. The process of producing valuable condensation products from acetaldehyde comprising subjecting said acetaldehyde in conjunction with hydrogen to the action of a mixed catalyst comprising essentially alumina in admixture with copper and magnesia.

31. The process of producing valuable condensation products from aliphatic aldehydes comprising subjecting such aliphatic aldehydes in conjunction with hydrogen to the action of a mixed catalyst comprising essentially alumina in admixture with copper and barium oxide.

32. The process of producing valuable condensation products from acetaldehyde comprising subjecting said acetaldehyde in conjunction with hydrogen to the action of a mixed catalyst comprising essentially alumina in admixture with copper and barium oxide.

WALTER PHILIP JOSHUA.
HERBERT MUGGLETON STANLEY.
JOHN BLAIR DYMOCK.
OTTO FUCHS.
WILHELM QUERFURTH.